US006717668B2

(12) United States Patent
Treado et al.

(10) Patent No.: US 6,717,668 B2
(45) Date of Patent: Apr. 6, 2004

(54) SIMULTANEOUS IMAGING AND SPECTROSCOPY APPARATUS

(75) Inventors: Patrick J. Treado, Allegheny County, PA (US); Arjun Bangalore, Allegheny County, PA (US); Matthew P. Nelson, Allegheny County, PA (US); Christopher T. Zugates, Allegheny County, PA (US)

(73) Assignee: ChemImage Corporation, Pittsburgh, PA (US)

( * ) Notice: Subject to any disclaimer, the term of this patent is extended or adjusted under 35 U.S.C. 154(b) by 41 days.

(21) Appl. No.: 09/800,953

(22) Filed: Mar. 7, 2001

(65) Prior Publication Data

US 2001/0052979 A1 Dec. 20, 2001

Related U.S. Application Data

(60) Provisional application No. 60/187,560, filed on Mar. 7, 2000.

(51) Int. Cl.[7] .................................................. G01J 3/28
(52) U.S. Cl. ........................ 356/327; 356/326; 356/300
(58) Field of Search ................................ 356/326, 456, 356/301, 317, 318, 300, 327, 328, 364, 365, 369; 600/160, 181, 182, 310, 317, 329, 342, 473, 476, 478

(56) References Cited

U.S. PATENT DOCUMENTS

| 5,194,912 A | 3/1993 | Batchelder et al. ......... 356/301 |
| 5,377,004 A | 12/1994 | Owen et al. ................. 356/301 |
| 5,442,438 A | 8/1995 | Batchelder et al. ......... 356/301 |
| 5,528,393 A | 6/1996 | Sharp et al. .................. 359/53 |
| 5,623,342 A | 4/1997 | Baldwin et al. ............. 356/301 |
| 5,626,134 A * | 5/1997 | Zuckerman .................. 356/41 |
| 5,689,333 A | 11/1997 | Batchelder et al. ......... 356/301 |
| 5,710,626 A | 1/1998 | O'Rourke et al. .......... 356/301 |
| 5,862,273 A | 1/1999 | Pelletier ....................... 385/12 |
| 5,901,261 A | 5/1999 | Wach ........................... 385/38 |
| 5,911,017 A | 6/1999 | Wach et al. .................. 385/12 |
| 6,002,476 A * | 12/1999 | Treado ......................... 356/301 |
| 6,052,187 A * | 4/2000 | Krishnan et al. ............ 356/364 |
| 6,069,690 A * | 5/2000 | Xu et al. ........................ 356/73 |
| 6,175,750 B1 * | 1/2001 | Cook et al. ............... 250/252.1 |
| 6,404,497 B1 * | 6/2002 | Backman et al. ........... 356/369 |

OTHER PUBLICATIONS

R. D. Guenther, "Modern Optics", John Wiley and Sons, New York, 1990, pp. 529–534.*

Treado et al. "A Thousand Points of Light: The Hadamard Transform" *Analytical Chemistry* 61 Jun. 1, 1989 No. 11, pp 722–734.

(List continued on next page.)

*Primary Examiner*—Thong Nguyen
*Assistant Examiner*—Arnel C. Lavarias

(57) ABSTRACT

An apparatus incorporated within a spectroscopic imaging system, typically a microscope, but also applicable to other image gathering platforms, namely fiberscopes, macrolens imaging systems and telescopes employing a polarizing beam splitting element is disclosed. The apparatus allows simultaneous spectroscopic (i.e. chemical) imaging and rapid acquisition spectroscopy to be performed without the need for moving mechanical parts or time sequenced sampling and without introducing significant optical signal loss or degradation to the spectroscopic imaging capability. In addition, the apparatus affords a more compact design, an improved angular field of view and an improved overall ruggedness of optical design at a lower manufacturing and maintenance cost compared to previous devices.

16 Claims, 7 Drawing Sheets

OTHER PUBLICATIONS

P. Treado et al., "High–Fidelity Raman Imaging Spectrometer: A Rapid Method Using an Acousto–Optic Tunable Filter", vol. 46 *Applied Spectroscopy*, No. _, pp. 1211– (1992).

H. Morris, C. Hoyt, P. Miller and P. Treado, "Liquid Crystal Tunable Filter Raman Chemical Imaging", vol. 50 *Applied Spectroscopy*, No. 6, pp. 805–811 (1996).

H. Skinner, T. Cooley, S, Sharma and S. Angel, "Remote Raman Microimaging Using an AOTF and a Spatially Coherent Microfiber Optial Probe", vol. 50 *Applied Spectrometry* No. 8, pp. 1007–1014 (1996).

I. Lewis and P. Griffiths, "Raman Spectroscopy with Fiber–Optic Sampling", vol. 50 *Applied Spectoscopy*, No. 10, pp. 12A–29A (1996).

* cited by examiner

A.

B.

Performance with Holographic Filter

Performance with Dielectric Filter

SIMULTANEOUS IMAGING AND SPECTROSCOPY APPARATUS

This application claims the benefit of U.S. Provisional Application Ser. No. 60/187,560, entitled "Simultaneous Imaging and Spectroscopy Apparatus" filed Mar. 7, 2000.

FIELD OF THE INVENTION

The present invention relates generally to spectroscopic imaging systems and, more particularly, to a method and apparatus for enhancing the overall efficiency of Raman, fluorescence, photoluminescence, ultraviolet, visible, and infrared absorption spectroscopic imaging systems employing polarization sensitive imaging spectrometers.

BACKGROUND OF THE INVENTION

Spectroscopic imaging combines digital imaging and molecular spectroscopy techniques, which can include, Raman scattering, fluorescence, photoluminescence, ultraviolet, visible and infrared absorption spectroscopies. When applied to the chemical analysis of materials, spectroscopic imaging is commonly referred to as chemical imaging. Instruments for performing spectroscopic (i.e. chemical) imaging typically comprise image gathering optics, focal plane array imaging detectors and imaging spectrometers.

In general, the sample size determines the choice of image gathering optic. For example, a microscope is typically employed for the analysis of submicron to millimeter spatial dimension samples. For larger objects, in the range of millimeter to meter dimensions, macro lens optics are appropriate. For samples located within relatively inaccessible environments, flexible fiberscopes or rigid borescopes can be employed. For very large scale objects, such as planetary objects, telescopes are appropriate image gathering optics.

For detection of images formed by these various optical systems, two-dimensional, imaging focal plane array (FPA) detectors are typically employed. The choice of FPA detector is governed by the spectroscopic technique employed to characterize the sample of interest. For example, silicon (Si) charge coupled device (CCD) detectors, a type of FPA, are typically employed with visible wavelength fluorescence and Raman spectroscopic imaging systems, while indium gallium arsenide (InGaAs) FPA detectors are typically employed with near-infrared spectroscopic imaging systems.

A variety of imaging spectrometers have been devised for spectroscopic imaging systems. Examples include, without limitation, grating spectrometers, filter wheels, Sagnac interferometers, Michelson interferometers and tunable filters such as acousto-optic tunable filters (AOTFs) and liquid crystal tunable filters (LCTFs).

A number of imaging spectrometers, including AOTFs and LCTFs are polarization sensitive, passing one linear polarization and rejecting the orthogonal linear polarization. As a result, theoretical efficiency is 50%. Practical efficiency is reduced due to scattering losses, imperfect spectrometer action, absorption losses in polarizing optics, etc. Practical efficiency of 30% peak transmittance or less is more typical. Previous spectroscopic imaging instruments accepted the optical losses associated with polarization sensitive imaging spectrometers.

In a paper by Patrick Treado, et. Al. entitled "High-Fidelity Raman Imaging Spectrometry: A Rapid Method Using an Acousto-Optic Tunable Filter" Applied Spectroscopy (1992)-46, 1211, the authors describe the use of an AOTF imaging spectrometer for Raman spectroscopic imaging. The instrumental approach uses a polarization sensitive imaging spectrometer to provide spectral tuning of Raman images. In operation, over 60% of the Raman scattered radiation is rejected by the optical system, with the majority of the loss being due to polarized Raman scattered radiation that is not captured through the polarization sensitive tunable filter.

A variety of spectroscopic imaging systems have been devised that make use of the polarized spectroscopic information typically rejected by polarization sensitive imaging spectrometer. For example, in a paper by Hannah Morris, et. al. entitled "Liquid Crystal Tunable Filter Raman Chemical Imaging," Applied Spectrosc. (1996)—Morris, Hannah R.; Hoyt, Clifford C.; Miller, Peter; and Treado, Patrick J. "Liquid Crystal Tunable Filter Raman Chemical Imaging," Appl. Spectrosc. 50 (1996) 805–811, the authors describe a polarization sensitive imaging spectrometer that operates to collect Raman spectroscopic image information. The imaging spectrometer is generally efficient at gathering wavelength-resolved spectroscopic imaging information, but less efficient at rapidly gathering full spectral information. However, for rapid acquisition of non-imaging Raman spectral data the output of the microscope is coupled either via direct beam or fiber optic to a dispersive Raman spectrograph. In order to select between imaging and non-imaging spectral data collection modes, movable mirror assemblies are typically used. Both operating modes are generally useful in spectroscopic imaging systems, whereas the imaging spectrometer mode is optimized for image characterization of samples of interest, while the non-imaging spectral mode is effective for spectral characterization of samples of interest.

In U.S. Pat. No. 6,002,476, a polarization sensitive imaging spectrometer having enhanced transmission efficiency is disclosed. Despite the enhanced transmission efficiency of the imaging spectrometer, over 50% of the light is lost to the polarization order not detected by the imaging detector.

In U.S. Pat. No. 5,689,333, one means to improve the overall efficiency of a Raman microscope that can be employed for spectroscopic imaging using filter wheels, is to make effective use of holographic laser rejection filters as beamsplitters for efficient coupling of the laser source into the microscope. To those practiced in the art of Raman microscopy, the use of holographic filters is thought to be an essential component of high performance Raman instrumentation.

SUMMARY OF THE INVENTION

To address the need for improved overall performance efficiency for spectroscopic imaging systems reliant upon polarization sensitive imaging spectrometers that discard up to 50% of the light absorbed, emitted or scattered by the sample, a novel apparatus has been developed that has been incorporated within spectroscopic imaging instruments. This apparatus employs a polarization beamsplitter to couple the light typically discarded by the polarization sensitive imaging spectrometer to a non-imaging spectrometer to simultaneously record a spectrum of the sample. The design of the simultaneous imaging and spectroscopy apparatus has several distinct advantages over the prior art:

First, the polarization beamsplitter allows simultaneous spectroscopic imaging and spectroscopy to be performed without the need for moving mechanical parts or time sequenced sampling. This advantage is particularly useful in rapid sample screening applications where minimizing sampling time is beneficial.

Second, the polarization beamsplitter is incorporated within the infinity-corrected optical pathlength of the spectroscopic imaging system, without introducing significant optical signal loss. The added capability of simultaneous spectral sampling is provided without degrading the spectroscopic imaging capability, effectively doubling the overall optical efficiency of the spectroscopic imaging system integrated with non-imaging spectrometer technology.

Third, the polarization beamsplitter affords a more compact design than movable mirror designs, as well as improved overall ruggedness of optical design which is important for use in high vibration environments.

Fourth, the dielectric filters employed as beamsplitters to couple laser excitation into microscope systems provides an improved angular field of view relative to more conventional holographic filter implementations. As a result, for wide field of view laser source illumination, improved laser background rejection efficiency is provided, as well as reduced sensitivity to angular alignment. Reduced sensitivity to angular alignment is beneficial since it improves the ruggedness of the optical system and the overall ease of alignment. This in turn reduces the cost of manufacturing and instrument maintenance.

The various aspects of the present invention may be more clearly understood and appreciated from a review of the following detailed description of the disclosed embodiments and by reference to the appended drawings and claims.

BRIEF DESCRIPTION OF THE DRAWINGS

FIG. 1 represents an image-forming device including, but not limited to, a microscope, a fiberscope, a boroscope, and a macro lens.

DETAILED DESCRIPTION OF THE INVENTION

Figure 1:
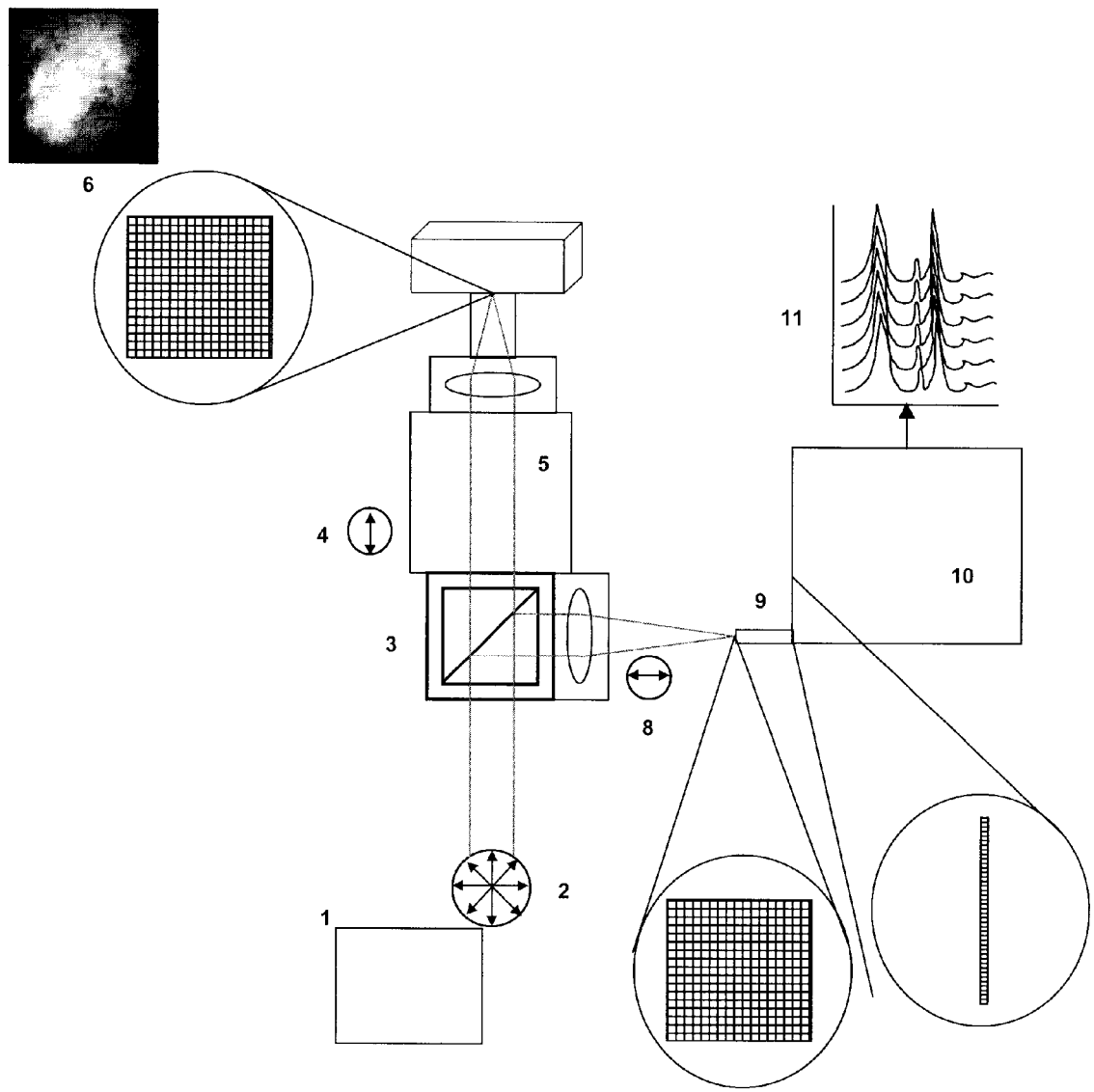
FIG. 1 is a schematic representation of a simultaneous imaging and spectroscopy apparatus, developed by ChemIcon, Inc.

FIG. 1 schematically shows the operation of a spectroscopic imaging system using any image-forming device 1 such as a microscope, fiberscope, boroscope or macro lens.

In operation, light from the sample forming the image is randomly polarized 2 and split into parallel and perpendicular polarized lights by a polarization sensitive beamsplitter 3, such as a polarizing cube. Parallel polarized light 4 is transmitted by beamsplitter 3 to an imaging spectrometer 5 o generate a spectrum 6. The perpendicular polarized light 8 transmitted by beamsplitter 3 which is reflected at 90° passes through a lens on to a dimension reduction fiber optic array 9 which converts a two-dimensional image to a one-dimensional array. The one-dimensional array becomes the slit of the spectrometer 10 that allows collection of a plurality of position specific spectra 11. A major advantage of using this polarization detection technology is the simultaneous, real-time collection of multiple spectra over broad wavelength range and wavelength resolved images.

Figure 2:
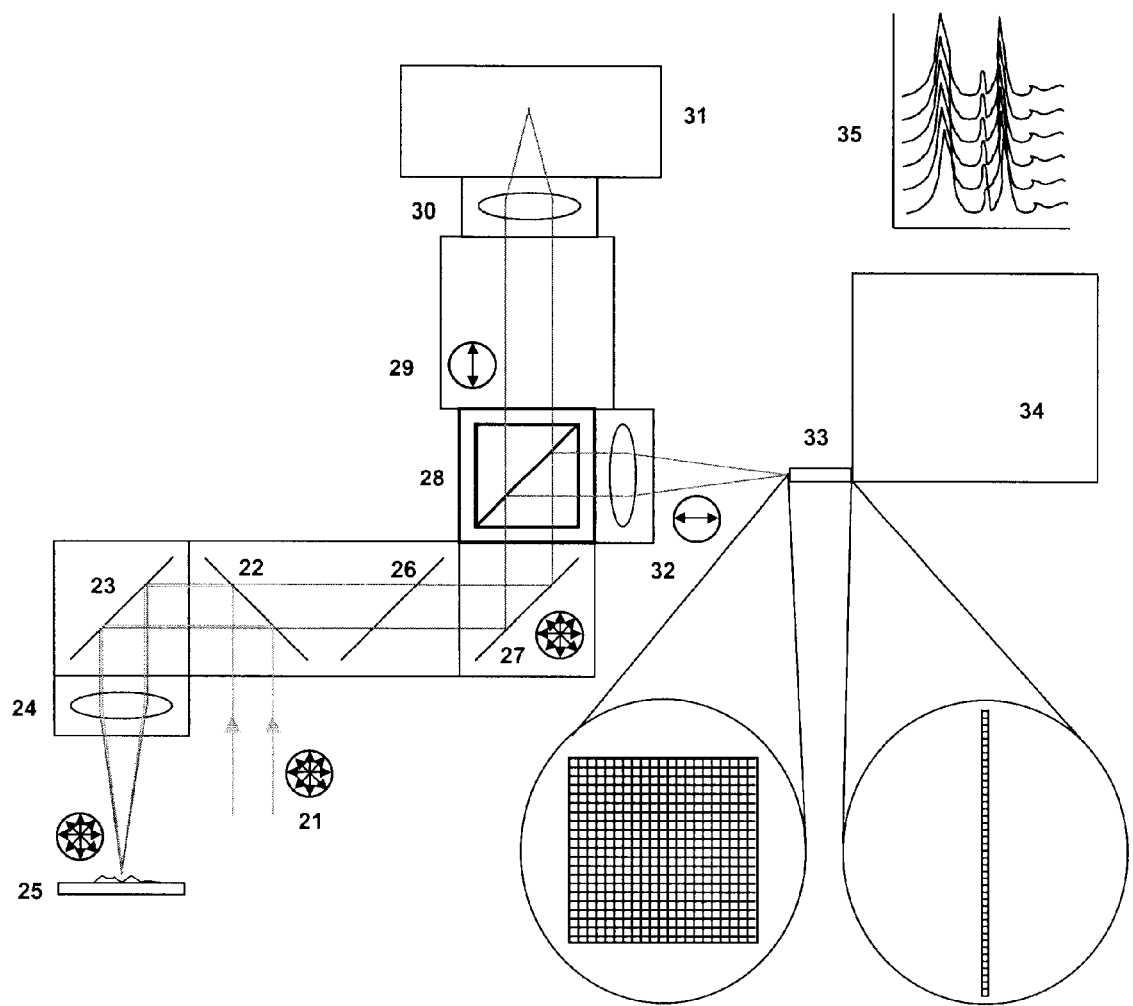
FIG. 2 shows schematically, the implementation of a simultaneous imaging and spectroscopy apparatus in a Raman imaging system.

FIG. 2 schematically represents the polarization detection technology of the present invention incorporated into a Raman imaging system. Light source 21 is coupled to the system directly, via mirrors, via a fiber optic, or via a rigid lightguide. When coupled via a fiber optic the light beam is randomly polarized. A beamsplitter device 22 that can be comprised of several different means, including a 50/50 beamsplitter, dielectric interference dichroic beamsplitter, holographic optical filter, rugate optical filter or a patterned beamsplitter, directs the light beam towards a turning mirror 23 which rotates the light beam 90°. The light beam directed towards an objective 24 comprised of a microscope objective, a macro-lens, a coherent fiberscope or boroscope which focuses the light beam onto the sample 25. Light from the sample, including Raman scatter, fluorescence or photoluminescence is randomly polarized and generates an image of the sample that is gathered by objective 24 and the beam retraces the same optical path as the light illumination source. Mirror 23 directs the emitted light which is transmitted through the beamsplitter device 22. Most of the randomly polarized light will pass through device 22 although a portion will be reflected.

A laser rejection filter 26 comprised of a dielectric interference filter, holographic optical filter or rugate optical filter removes the laser light while transmitting other wavelengths of the optical beam directed through the beamsplitter device 22. In a preferred embodiment, mirror 27 directs the randomly polarized optical beam to a polarization sensitive beamsplitter 28 comprised of a polarizing cube or a thin film polarizing beamsplitter that splits the randomly polarized emitted light into parallel and perpendicular polarized optical beams.

Parallel polarized light 29 transmitted by the polarization beamsplitter 28 is directed to an imaging spectrometer such as a polarization sensitive LCTF. The spectrometer transmits wavelength specific images under computer control without image degradation which is reformed by a lens 30 onto a focal plane array (FPA) detector 31 comprised of a Silicon charge-coupled device (CCD) detector, charge-injection device (CID) detector or infrared FPA.

Perpendicular polarized light 32 is reflected at 90° to the optical axis by the polarization beamsplitter 28 to a lens that directs the emitted light to a dimension-reduction fiber optic array 33. The dimension-reduction fiber optic array dissects the two spatial image dimensions into a single dimension via a two dimensional fiber optic array that is drawn into a distal one dimensional array with serpentine ordering. The one dimensional end of the fiber array becomes the effective slit for a spectrometer 34 enabling the user to capture thousands of position specific spectra 35 in a single CCD image. A key characteristic of the polarization detection technology with a dimension-reduction fiber array is the ability to simultaneously, in real-time, collect both multiple spectra over a broad spectral range and wavelength-resolved images.

Figure 3:
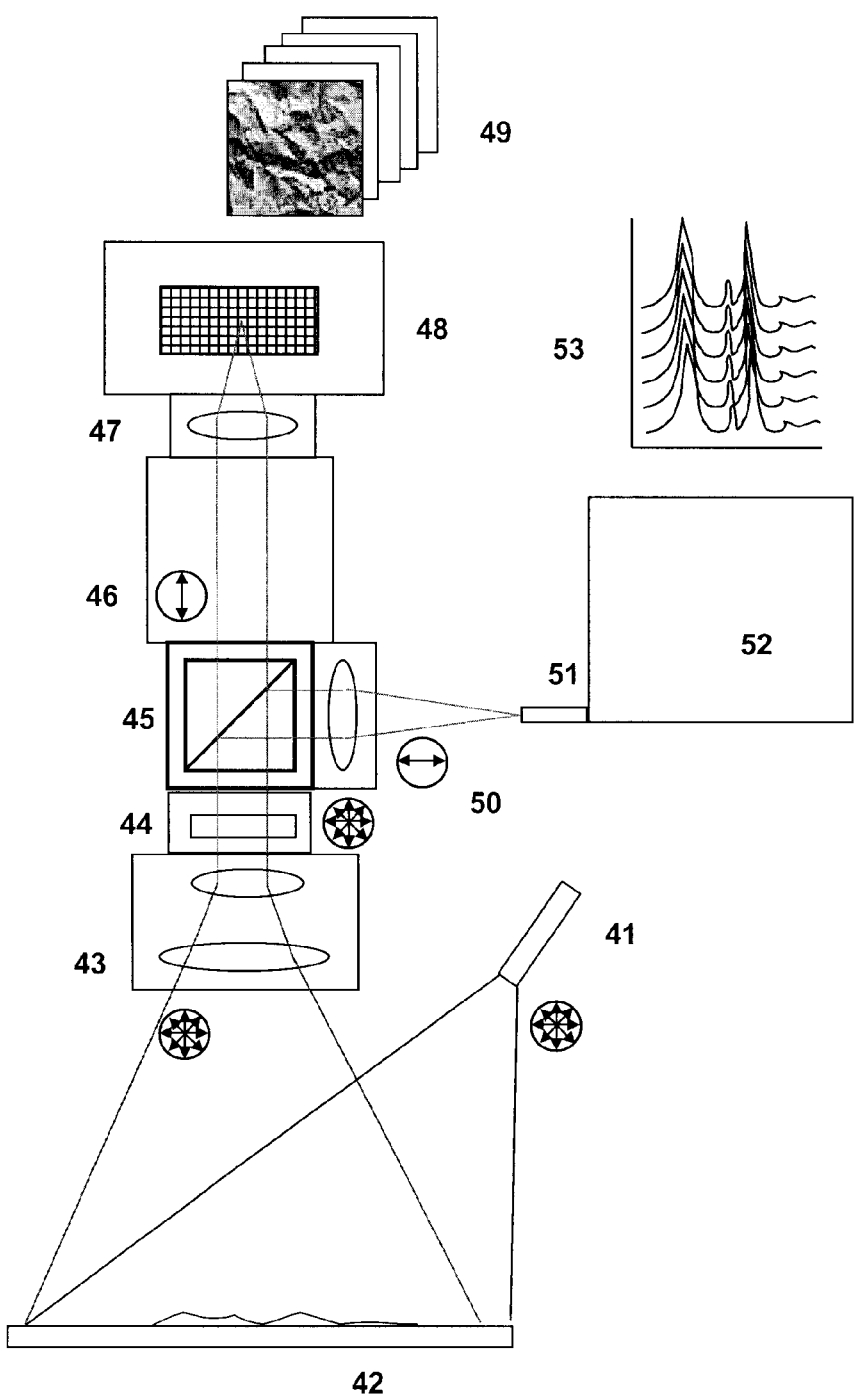
FIG. 3 shows schematically, the implementation of a simultaneous imaging and spectroscopy apparatus in a spectroscopic imaging macro system.

FIG. 3 schematically shows the polarization detection technology of the present invention incorporated into a spectroscopic imaging macro system. In FIG. 3, illumination light source 41 which may be laser, ultraviolet, broadband, infrared, xenon, solarized or other source, is coupled to the system directly, via mirrors, via a fiber optic, or via a rigid or flexible lightguide. This light may be randomly or specifically polarized. The light illuminates the sample 42 which scatters the light in either randomly, linear, elliptical polarized orientations. The scattered light is collected by means of an optic system 43 which can be simple, compound, macro, zoom or other. The lens system does not significantly affect the light polarization. The collected light is next spectrally processed to exclude undesired wavelength bands using an emission filter device 44. For fluorescence configurations this would be a high pass filter to remove the excitation wavelength band. For Raman experiments using laser illumination this would be either a holographic laser rejection filter or a high rejection dielectric bandpass filter. The randomly polarized optical beam next passes into a polarization sensitive beamsplitter 45 comprised of a polarizing cube or a thin film polarizing beamsplitter that splits the randomly polarized emitted light into parallel and perpendicular polarized optical beams Parallel polarized light 46 transmitted by the polarization beamsplitter 45 is directed to an imaging spectrometer comprised of a polarization sensitive electrically tunable filter with a wide aperture. The tunable filter transmits wavelength specific images under computer control without image degradation which are formed by a lens system 47 onto a focal plane array (FPA) detector 48 comprised of a cooled or uncooled Silicon charge-coupled device (CCD) detector, charge-injection device (CID) detector or infrared FPA. Hundreds of thousands of image pixels are simultaneously collected for the wavelength passband of the tunable filter. Multiple image frames are collected through coordinated control of the filter passband and imaging sensor to form hyperspectral image data sets 49 of the material being chemically imaged.

Figure 4:
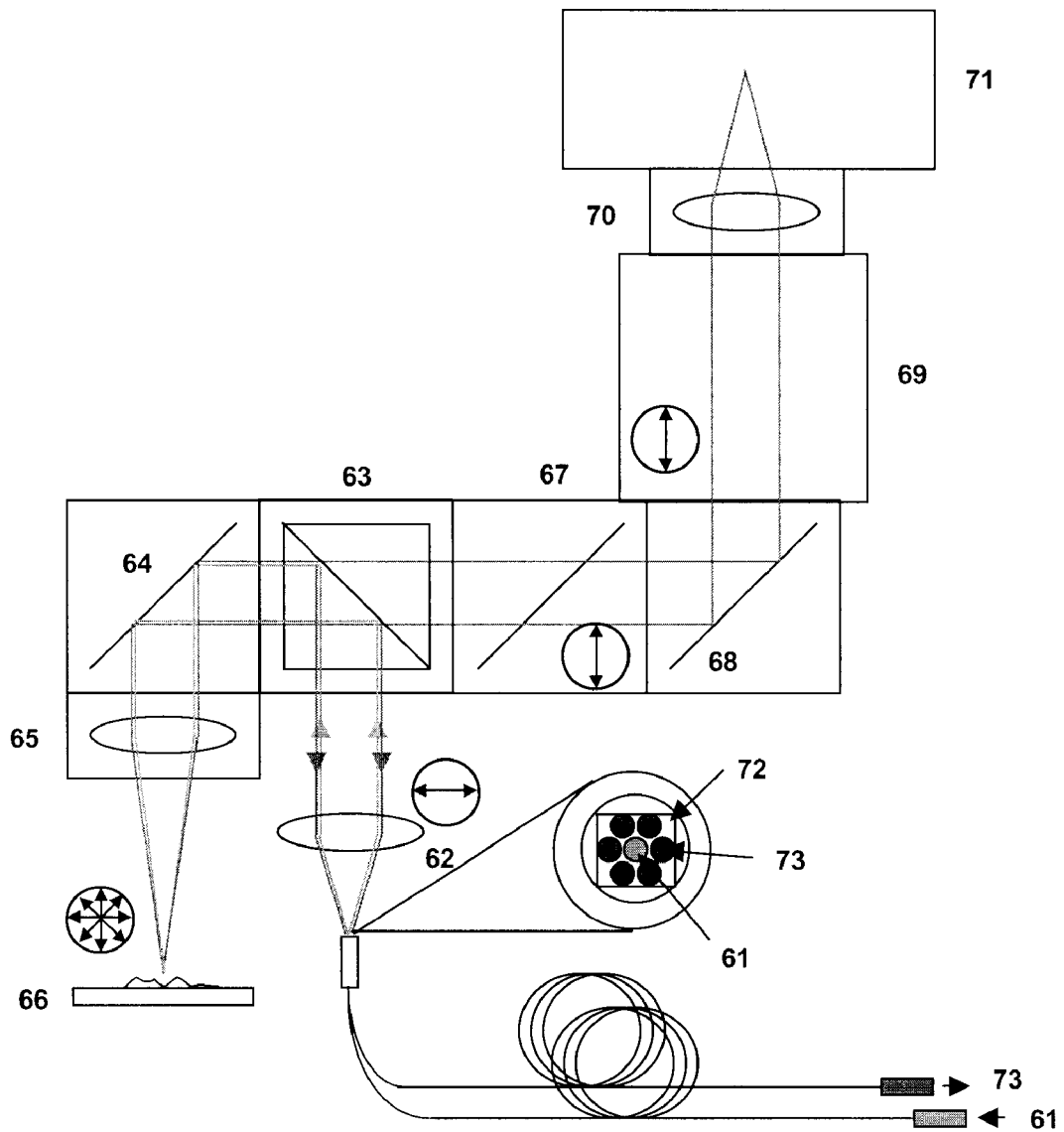
FIG. 4 shows a schematic drawing of the simultaneous imaging and spectroscopy apparatus optical design where the polarizing cube is incorporated into the excitation optical path.

Perpendicular polarized light 50 is reflected from the polarization sensitive beamsplitter 45 at 90° to the optical axis into an optical system that directs the emitted light to a dimension-reduction fiber optic array 51. The dimension-reduction fiber optic array dissects the two spatial image dimensions into a single dimension via a two dimensional proximal fiber optic array that is drawn into a distal one dimensional array with serpentine ordering. The one dimensional end of the fiber array is imaged onto the slit of a dispersive spectrometer 52 enabling the capture thousands of position specific spectra 53 in a single CCD image. A key characteristic of the polarization detection technology with a dimension-reduction fiber array is the ability to simultaneously, in real-time, collect both multiple spectra over a broad spectral range and wavelength-resolved images FIG. 4 schematically represents the polarization illumination technology incorporated into a spectroscopic imaging system wherein the polarizing cube is incorporated into the excitation optical path. A polarized light source is coupled into the system by a polarization maintaining fiber optic 61 which is positioned in the center of six collection fibers (six-around-one arrangement discussed below). The light emitted from the fiber 61 is collimated by a lens 62. A polarization sensitive beamsplitter 63 comprised of a polarizing cube or a thin film polarizing beamsplitter directs the polarized light towards a turning mirror 64 which rotates the light beam 90°. The light is directed towards an objective 65 comprised of a microscope objective, a macro-lens, a coherent fiberscope or boroscope which focuses the light beam onto the sample 66. Light from the sample, including Raman scatter, fluorescence or photoluminescence is randomly polarized and generates an image of the sample 66 that is gathered by objective 65 and retraces its path along the same optical path as the light illumination source. Mirror 64 directs the emitted light to the polarization sensitive beamsplitter device 63.

Parallel polarized light is transmitted through the polarization beamsplitter device to a laser rejection filter 67 comprised of a dielectric interference filter, holographic optical filter or rugate optical filter that removes the laser light while transmitting other wavelengths of the optical beam. Mirror 68 directs the polarized optical beam to an imaging spectrometer 69 such as a polarization sensitive LCTF. Spectrometer 69 transmits wavelength specific images under computer control without image degradation which is reformed by a lens 70 onto an imaging detector 71, preferably comprised of a silicon charge-coupled device (CCD) detector, charge-injection device (CID) detector or infrared FPA.

Perpendicular polarized light is reflected back through lens 62 which refocuses the light onto the fiber optic bundle with a six-around-one arrangement. A laser rejection filter 72 comprised of a micro-plasma notch filter removes the laser light while transmitting other wavelengths of the optical beam towards the laser illumination source via the collection fiber optics 73. The collected radiation is then injected in parallel through the collection fibers into a dispersive spectrometer for simultaneous full spectrum analysis. A key characteristic of the polarization illumination technology is the ability to illuminate the sample using an ultracompact optical design that is mechanically robust and appropriate for rugged environments. In addition, the system enables the simultaneous, real-time collection of both multiple spectra over a broad spectral range and wavelength-resolved images. A primary advantage of this configuration is the compactness of the design.

Figure 5:
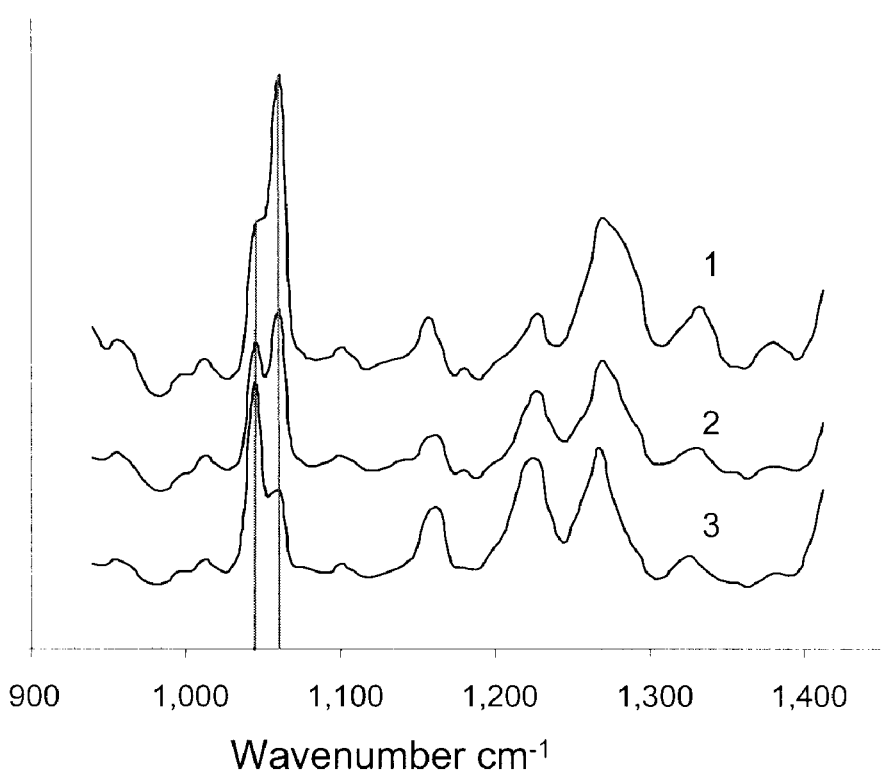
FIGS. 5A and 5B show dispersive Raman spectra and a Raman image, respectively, captured simultaneously using the simultaneous imaging and spectroscopy apparatus.
Figure 5:
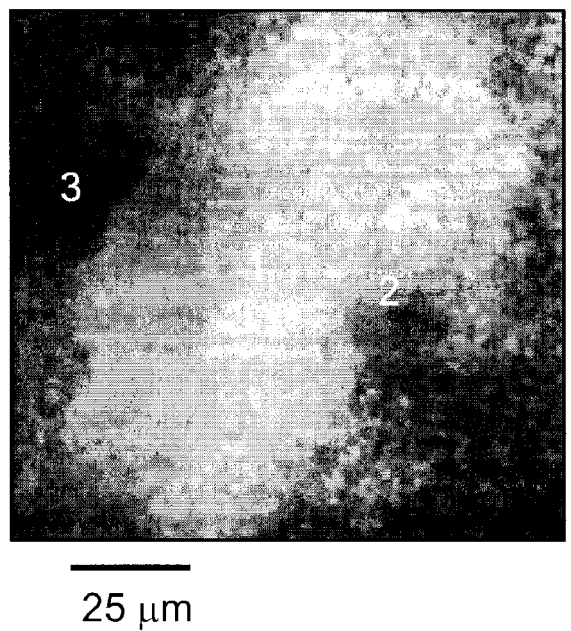

FIGS. 5A and 5B show dispersive Raman spectra and a Raman image, respectively, captured simultaneously using the simultaneous imaging and spectroscopy apparatus. The sample being analyzed consisted of a pharmaceutical tablet with domains of an active ingredient within a inactive ingredient matrix. The dispersive spectra in the figures were collected from three (3) different sample locations (locations shown in the Raman image (FIG. 5B)). The variations of the two peaks indicated at Raman Bands 1044 $cm^{-1}$ and 1060 $cm^{-1}$ reflect the variations in active ingredient material (aspirin) and the inactive ingredient matrix, respectively. Intensities of the Raman bands vary as a function of the position in which the dispersive Raman spectra were collected from the sample. The Raman image in FIG. 5B reveals the distribution of active ingredient with the inactive ingredient matrix. By scanning the sample surface with a simultaneous imaging and spectroscopy apparatus in operation enables the user to rapidly locate regions of interest. For the example given in FIG. 5, the active ingredient domains could be rapidly imaged as the dispersive spectroscopy guided the user to the location of domains.

Figure 6:
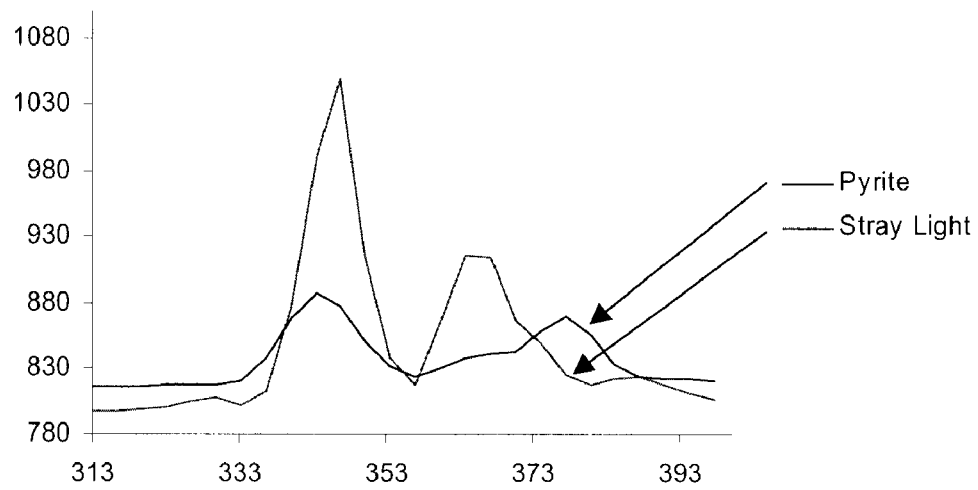
FIGS. 6A and 6B compares the background performance of a holographic filter set and a dielectric filter set, respectively, for a blank substrate. The dielectric filter exhibits improved background performance (less stray light) due to increased rejection angular field of view.
Figure 6:
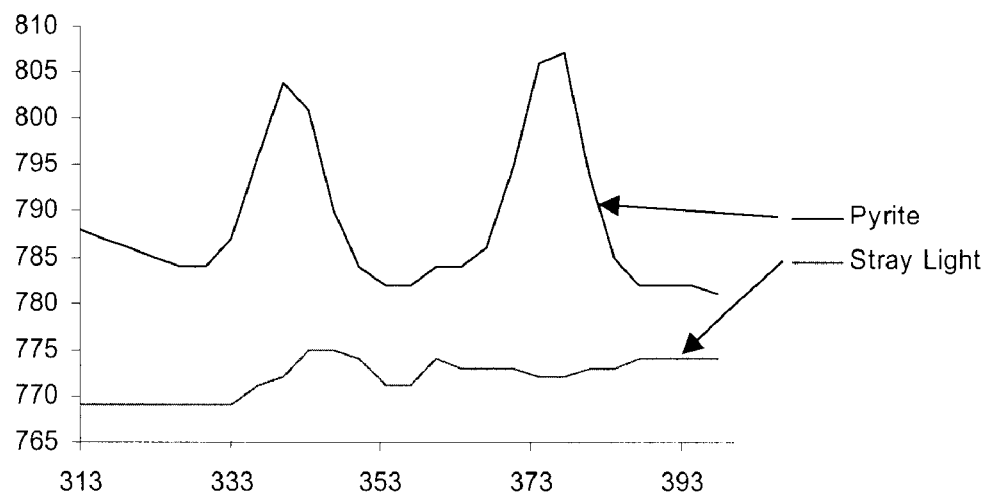

FIG. 6 depicts Raman spectra obtained using the Raman imaging instrument as configured with either holographic filters or dielectric filters. The spectra were obtained from a pyrite sample that did not fill the entire image area. This permitted sampling spectra in areas dominated by stray light and pyrite Raman signal, respectively. Illumination intensity and exposure time were identical for all spectra obtained. As can be seen from the spectra, the stray light intensity is significantly greater when using the holographic filter configuration when compared to the dielectric filter configuration. The stray light in this case was 3 times the magnitude of the pyrite signal. When the dielectric were used the stray light was reduced to 25% of the pyrite signal.

Figure 7:
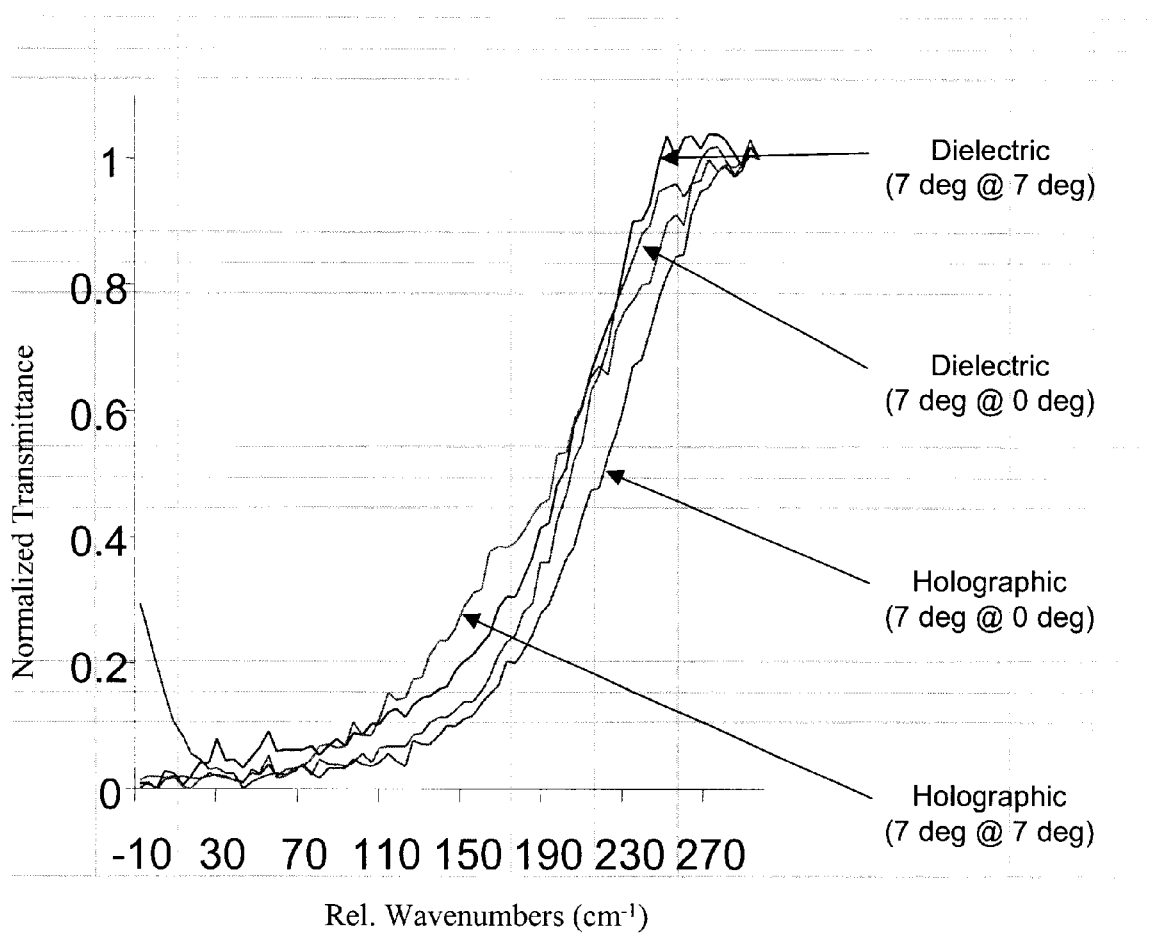
FIG. 7 shows the sensitivity of the transmittance edge performance of holographic and dielectric filters to changes in angles of incidence, as tested on a Raman spectroscopic imaging microscope.

FIG. 7 depicts the off angle performance characteristics of holographic and alpha omega filters. In any embodiment of an instrument, light will impinge on the filter surface at angles other than the designed working angle. As the figure illustrates, the alpha omega filters performance dependence on working angle is significantly superior to the holographic filter. Both filters were designed with a working angle of 7 degrees and the filters were tested with the angle of incidence at the working angle of 7 degrees plus an off angle of 0° (working angle error of 7°). As indicated by the graph, at non-ideal working angles, the holographic filter performance is reduced while the alpha omega filter retains its band shape performance at the off angle condition.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

We claim:

1. An imaging system for enabling simultaneous collection of a spectrum and a spectroscopic image from a sample comprising:
   a. a polarization beamsplitter for separating light from said sample into parallel and perpendicular polarized light components;
   b. a spectroscopic imaging system for converting one of said parallel and perpendicular polarized light components into a spectroscopic image of said sample;
   c. a spectra generating system for converting the other of said polarized parallel and perpendicular light components into at least one spectra of said sample; and
   d. said polarized parallel and perpendicular light components simultaneously coupled with said spectroscopic imaging system and said spectra generating system, respectively, by said polarizing beamsplitter.

2. The system of claim 1 wherein the spectroscopic imaging system comprises an objective for collecting a spectrum of scattered light from said parallel light transmitted by said beamsplitter and producing a collimated beam therefrom; a filter for selecting a spectroscopic image of said collimated beam and producing a filtered spectroscopic image therefrom; and a detector for collecting said filtered spectroscopic image.

3. The system of claim 2 wherein said filter is at least one of a liquid crystal tunable filter, an acousto-optic tunable filter, a Fabry-perot filter, a filter wheel, a Sagnac interferometer, a Michelson interferometer, and a diffraction grating.

4. The system of claim 1 wherein the spectra generating system comprises an objective for collecting a spectrum of scattered light from said perpendicular light transmitted by said beamsplitter and producing a collimated beam therefrom having a two-dimensional image; a fiber optic array for producing a one-dimensional array from said two-dimensional image; and a spectrometer for producing at least one spectra, said one-dimensional array functioning as the slit of said spectrometer.

5. The system of claim 4 wherein said spectrometer is at least one of a dispersive spectrometer, a FT spectrometer, and a transmissive holographic spectrometer.

6. The system of claim 4 further comprising at least one of a laser and illumination rejection filter which removes laser light from the perpendicular light.

7. The system of claim 6 wherein said at least one of a laser and illumination rejection filter is at least one of a dielectric interference filter, a holographic optical filter or a rugate optical filter.

8. The system of claim 7 wherein said dielectric interference filter is one of a notch bandreject and longpass type.

9. The system of claim 1 wherein said light from said sample is at least one of Raman, fluorescence, photoluminescence, UV/visible absorption/reflectance, near infrared absorption/reflectance and Mid-infrared absorption/reflectance.

10. The system of claim 1 wherein the spectra generating system output is a direct beam coupled to a spectrometer.

11. The system of claim 1 wherein said system is incorporated into a microscope-based spectroscopic imaging system.

12. The system of claim 1 wherein said system is incorporated into a macroscope-based spectroscopic imaging system.

13. The system of claim 1 wherein said system is incorporated into a fiberscope-based spectroscopic imaging system.

14. The system of claim 1 wherein said system is incorporated into a telescope-based spectroscopic imaging system.

15. The system of claim 1 wherein said polarization beamsplitter is a polarizing cube beamsplitter.

16. The system of claim 1 wherein said polarization beamsplitter is a polarizing thin film beamsplitter.

* * * * *